(12) United States Patent
Tenbult

(10) Patent No.: US 11,277,971 B2
(45) Date of Patent: Mar. 22, 2022

(54) AGRICULTURAL BALER INCLUDING A BALE CHAMBER WITH A LOW TRACTION ROTARY COMPRESSION ELEMENT

(71) Applicant: Kuhn-Geldrop BV, Geldrop (NL)

(72) Inventor: Henriekus Theodorus Hubertus Tenbult, Bladel (NL)

(73) Assignee: Kuhn-Geldrop BV, Geldrop (NL)

( * ) Notice: Subject to any disclaimer, the term of this patent is extended or adjusted under 35 U.S.C. 154(b) by 324 days.

(21) Appl. No.: 16/384,615

(22) Filed: Apr. 15, 2019

(65) Prior Publication Data

US 2019/0239437 A1 Aug. 8, 2019

Related U.S. Application Data

(62) Division of application No. 15/319,868, filed as application No. PCT/EP2015/063873 on Jun. 19, 2015, now abandoned.

(30) Foreign Application Priority Data

Jun. 20, 2014 (GB) ..................................... 1411045

(51) Int. Cl.
*A01F 15/18* (2006.01)
*A01F 15/08* (2006.01)
(Continued)

(52) U.S. Cl.
CPC ............... *A01F 15/18* (2013.01); *A01D 89/00* (2013.01); *A01F 15/071* (2013.01);
(Continued)

(58) Field of Classification Search
CPC ...... A01D 89/00; A01F 15/07; A01F 15/0715; A01F 15/0883; A01F 15/0833;
(Continued)

(56) References Cited

U.S. PATENT DOCUMENTS 3,467,002 A * 9/1969 Bushmeyer ........... B30B 11/222
100/89
4,198,804 A * 4/1980 Konekamp ............. A01F 15/07
100/89
(Continued)

FOREIGN PATENT DOCUMENTS

DE 42 15 244 C2 11/1993
DE 4215244 A1 * 11/1993 ............. A01F 15/07
(Continued)

OTHER PUBLICATIONS

International Search Report dated Nov. 23, 2015, in PCT/EP2015/063873, filed Jun. 19, 2015.
(Continued)

*Primary Examiner* — Adam J Behrens
(74) *Attorney, Agent, or Firm* — Oblon, McClelland, Maier & Neustadt, L.L.P.

(57) ABSTRACT

A baler apparatus has a cylindrical bale-forming chamber defined by a set of compression elements positioned around the circumference of the bale-forming chamber, and drive means configured to drive rotary movement of the compression elements. At least one of the rotary compression elements is configured to provide a reduced level of traction relative to a bale in the bale chamber, as compared to at least the majority of the other rotary compression elements.

7 Claims, 8 Drawing Sheets

(51) Int. Cl.
*A01D 89/00* (2006.01)
*A01F 15/07* (2006.01)

(52) U.S. Cl.
CPC ........ *A01F 15/085* (2013.01); *A01F 15/0833* (2013.01); *A01F 15/0883* (2013.01); *A01F 2015/0775* (2013.01); *A01F 2015/186* (2013.01)

(58) Field of Classification Search
CPC .................. A01F 15/085; A01F 15/071; A01F 2015/186; A01F 2015/079; A01F 2015/0775; A01F 2015/075; A01F 2015/074; A01F 2015/0755; A01F 15/18
USPC ...................................................... 100/88, 89
See application file for complete search history.

(56) References Cited

U.S. PATENT DOCUMENTS

| | | | | | |
|---|---|---|---|---|---|
| 4,619,106 | A | * | 10/1986 | van der Lely | A01F 15/07 100/89 |
| 4,638,623 | A | * | 1/1987 | Schaible | A01F 15/07 56/341 |
| 4,782,652 | A | * | 11/1988 | White | A01F 15/07 100/88 |
| 5,005,747 | A | * | 4/1991 | Anstey | A01F 15/0715 226/190 |
| 5,394,682 | A | | 3/1995 | Frimml et al. | |
| 5,752,437 | A | * | 5/1998 | Wilkens | A01F 15/07 100/89 |
| 6,044,556 | A | * | 4/2000 | Petitfrere | A01F 15/07 29/895.211 |
| 6,139,478 | A | * | 10/2000 | Viaud | A01F 15/07 492/16 |
| 8,051,771 | B2 | * | 11/2011 | Smith | A01F 15/0833 100/88 |
| 2001/0001779 | A1 | * | 5/2001 | Viaud | A01F 15/07 492/47 |
| 2001/0013214 | A1 | * | 8/2001 | Viaud | A01F 15/0705 53/116 |
| 2001/0023223 | A1 | * | 9/2001 | Mornet | A01F 15/07 492/45 |
| 2010/0326294 | A1 | * | 12/2010 | Smith | A01F 15/07 100/88 |
| 2012/0240517 | A1 | * | 9/2012 | Chapon | A01F 15/071 53/203 |
| 2016/0007540 | A1 | * | 1/2016 | Schlichting | A01F 15/0883 56/432 |

FOREIGN PATENT DOCUMENTS

| | | | | |
|---|---|---|---|---|
| DE | 19712793 | A1 | 12/1997 | |
| EP | 0745319 | A1 | 12/1996 | |
| EP | 0978231 | A1 | 2/2000 | |
| EP | 2269440 | A1 | 1/2011 | |
| EP | 2 537 408 | A1 | 12/2012 | |
| EP | 2537408 | A1 * | 12/2012 | ............. A01F 15/18 |
| EP | 3 097 770 | A1 | 11/2016 | |
| EP | 3097770 | A1 * | 11/2016 | ............. A01F 15/18 |
| FR | 2 506 117 | A1 | 11/1982 | |
| FR | 2506117 | A1 * | 11/1982 | ............. A01F 15/07 |
| FR | 2520971 | A1 | 8/1983 | |
| FR | 2 663 191 | A1 | 12/1991 | |
| FR | 2663191 | A1 * | 12/1991 | ............. A01F 15/07 |
| GB | 2 212 416 | A | 7/1989 | |
| GB | 2212416 | A * | 7/1989 | ........... A01F 29/005 |

OTHER PUBLICATIONS

British Search Report dated Dec. 17, 2014 in Patent Application No. GB1411045.6, filed Jun. 20, 2014.
Krone Fortima 1500 V 1800 V—round balers (English)—Video . . . Oeni, oeni46499, (https://www.youtube.com/watch?v=1e-KTKu5ggU) published Nov. 27, 2011.

* cited by examiner

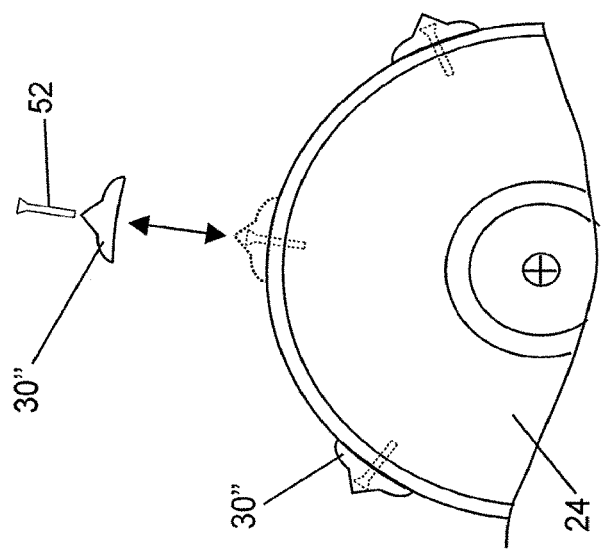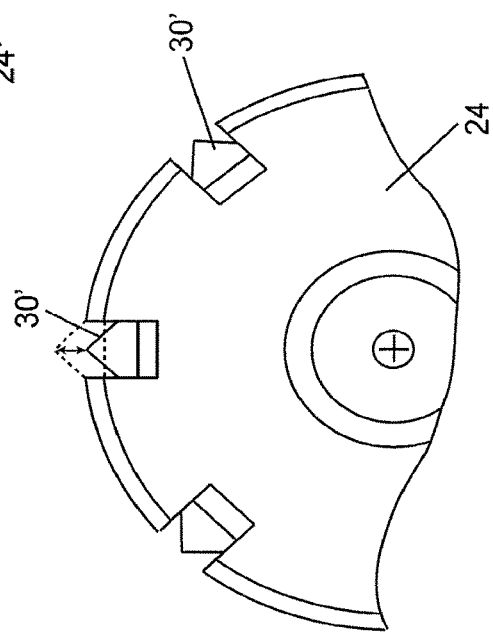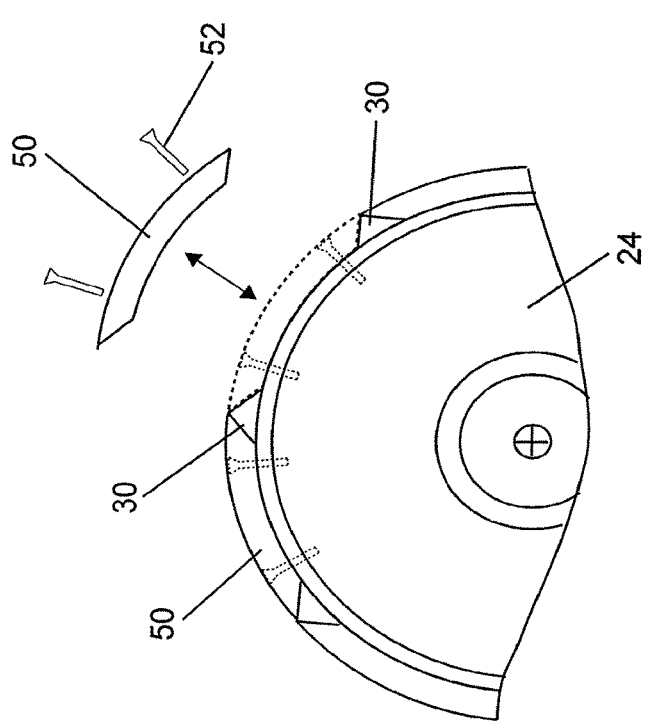

AGRICULTURAL BALER INCLUDING A BALE CHAMBER WITH A LOW TRACTION ROTARY COMPRESSION ELEMENT

CROSS-REFERENCE TO RELATED APPLICATIONS

The present application is a divisional application of U.S. patent application Ser. No. 15/319,868, filed Dec. 19, 2016, now pending, which is the U.S. national stage of PCT International Patent Application No. PCT/EP2015/063873, filed Jun. 19, 2015, which claims the benefit of British Patent Application No. 1411045.6, filed Jun. 20, 2014. The entire contents of all of the above-noted applications are hereby incorporated by reference in their entireties into the present disclosure.

BACKGROUND OF THE INVENTION

Field of the Invention

The present invention relates to an agricultural baler for forming a cylindrical bale. In particular but not exclusively, the invention relates to a baler for forming a cylindrical bale of agricultural crop materials, for example grass, straw or hay.

Description of Related Art

Agricultural balers for forming cylindrical bales are well known and widely used in agriculture. Various types of balers are known, including fixed chamber and variable chamber types, as well as hybrid types. The present invention relates primarily to balers of the fixed chamber type. This type of baler is described for example in DE3631159. However, it may also be applicable to balers of the variable chamber type, as well as hybrid types. The invention may also be applicable to combined baler/wrapper apparatus.

Typically, an agricultural baler of the fixed chamber type is pulled by a tractor and driven by the power take off of the tractor.

The material to be baled is picked up from the ground by a pick-up device. The material is optionally processed by a cutting device and then forwarded into the bale chamber, which contains a number of rotating compression rollers (or drive rollers). Once a certain amount of material has entered into the baling chamber the material starts to tumble, thus forming a cylindrical bale. As more material is fed into the bale chamber the material is pressed towards the center of the bale chamber, thereby compressing the bale.

When the material is sufficiently compressed the feeding of the material into the bale chamber is stopped and a binding material (usually a net material) is fed between the compression elements and the bale, and wrapped around the compressed bale material. The binding serves to keep the bale material under compression and in shape after the bale is ejected from the bale chamber. The binding material may alternatively consist of twine or plastic film material similar to that used for wrapping bales.

Once the bale has been bound the bale chamber is opened by lifting a tailgate to let the bale roll out of the bale chamber. After the closing of the tailgate the baling process is repeated.

Lately the degree of compression of the materials forming the bale has increased to form a denser bale. However, this can cause the following problem.

Due to the high compression of the bale material, when opening the tailgate the compressed material tends to expand due to the elasticity of the binding material. Typically the bale expands from a diameter of 1.2 metres to an expanded diameter of 1.3 metres or more.

The bale chamber typically comprises two approximately symmetrical halves, comprising a front part and a rear part, which are connected by a pivot joint at or near the top of the bale chamber. The rear part of the bale chamber forms the tailgate, which opens by pivoting about the pivot joint to provide a discharge opening. When the tailgate is opening the bale can expand to the front and the rear but cannot expand to the top or the bottom.

Typically, the compression rollers will be turning when the bale is ejected. When the bale is in the bale chamber the bale will turn with a circumferential speed equal to that of the compression rollers. During the ejection process the bale will stop turning and the (continually) turning compression rollers will rub over the binding material on the outer circumference of the bale. This rubbing will occur especially with the top and bottom rollers in the bale chamber, against which the bale initially cannot expand.

This phenomenon occurs particularly with the lower one or two rollers in the rear part and/or the one or two lower rollers in the front part, which tend to rub on one spot against the bale. Although all of these lower rollers can cause rubbing, the lower rollers in the front part of the baler sometimes cause less of a problem because the ejection direction of the bale is in the direction of rotation. The upper rollers do not usually cause a large problem since the weight of the bale is not carried by the upper rollers.

The rubbing of the rotating rollers can damage the binding material with the risk that the binding material will break and the bale will burst open. To avoid this problem more layers of binding material can be used on the bale. This will allow less expansion of the bale and so reduce the amount of rubbing, and the additional layers of material will suffer relatively less damage. However, applying additional layers of binding material will cost more and it also will take more time to put the material on the bale.

BRIEF SUMMARY OF THE INVENTION

It is an object of the invention to mitigate the above problem without the extra use of binding material.

According to certain preferred aspects of the invention, the following solutions to the aforesaid problem are provided to reduce the traction between at least one lower roller in the rear and/or front part of the bale chamber and the surface of the bale.

Solution 1: The lower roller (or rollers) in the rear and/or front part of the bale chamber is designed to provide a reduced level of friction against the surface of the bale. Therefore, traction between the lower roller and the bale will be reduced. In one embodiment the lower roller is substantially smoother and/or has fewer protruding parts/elements than the majority of rollers on other positions. Preferably the lower roller is a tube without any protrusions or traction parts. Alternatively the lower roller, with or without protrusions, could be provided with a surface or surface coating or surface treatment that has less friction with the binding material; e.g. the roller could be coated with Teflon or a similar coating or could be polished.

The other compression rollers are provided with protrusions or traction parts to ensure rotation of the bale in the bale chamber when the bale material is under pressure and there is a lot of friction between the bale and the side panels.

When no traction element or protrusions are on the lower roller the binding material will not be damaged by the rubbing during ejection of the bale.

When required a smooth lower roller can be provided with detachable/displaceable protrusions or fillers to cover the protrusions, in case protrusions are required for slippery material that requires traction of all rollers.

Solution 2: During the opening of the tailgate the lower roller (or lower rollers) will be disengaged from the driveline and preferably will be allowed to turn freely. Therefore, traction between the lower roller and the bale will be reduced or eliminated. This will mean that there is no speed difference between bale and the lower roller so no rubbing will occur. An advantage over the low friction roller (solution 1) is that the full traction to the bale will be given during compression of the bale. The disengagement of all rollers is not preferred because when opening the tailgate the bale must keep turning to ensure that the bale does not get stuck in either the front part of the bale chamber or the rear part (the tailgate).

Solution 3: At the opening of the tailgate the lower roller (or lower rollers) is displaced (or turned) away from the circumference of the bale so as to let the bale expand freely in a direction perpendicular to the opening direction of the bale chamber. Typically, the bale is allowed to expand in the vertical direction. Therefore, traction between the lower roller and the bale will be reduced or eliminated. Preferably the lower roller or the lower rollers are displaced by rotating a support frame for the lower rollers around a pivot that lies in line with the axle of the adjacent roller. Optionally, two rollers could be displaced together around the axis of an adjacent roller.

According to one aspect of the present invention there is provided an agricultural baler comprising: a frame, a pick-up device, a cylindrical bale chamber and a binding device that supplies a binding material for binding a bale formed in the bale chamber; wherein the bale chamber includes an inlet, two opposed side walls forming ends of the bale chamber, a set of rotary compression elements positioned within the bale chamber, and drive means configured to drive rotary movement of the rotary compression elements; wherein the bale chamber further comprises a front part and a rear part, each of said front and rear parts comprising approximately one half of the bale chamber, wherein the rear part is attached to the front part through a pivot joint so that the rear part can pivot between a closed condition for forming a bale in the bale chamber and an open condition for releasing a bale from the bale chamber, and wherein the set of rotary compression elements includes at least one low traction rotary compression element, which is located within a lower part of the bale chamber and is configured to provide a reduced level of traction to a bale in the bale chamber, as compared to a majority of the other rotary compression elements, at least when the rear part is in an open condition.

The front and rear parts of the bale chamber each comprise approximately one half of the bale chamber, and are therefore of substantially equal size, each comprising approximately one half of the internal volume of the bale chamber.

In one advantageous embodiment the pivot joint is located towards an upper part of the bale chamber. In other words, the pivot joint may be located at or near the top of the bale chamber. For example, the pivot joint may be located at the top of the bale chamber, or it may be located slightly in front of the top-most position, for example rotated up to 30 degrees, or possibly up to 45 degrees, in front of the top-most position.

The low traction rotary compression element is configured to provide a reduced level of traction to a bale in the bale chamber as compared to a majority (or all) of the other rotary compression elements. The term "a majority" as used herein means at least half of the other rotary compression elements. Typically, baler will include one or two low traction rotary compression elements, which may be located in the lower portion of the front and/or the rear part of the bale chamber.

In an embodiment, said low traction rotary compression element comprises a roller with a relatively smooth drive surface.

In an embodiment, said low traction rotary compression element comprises a roller with reduced drive elements as compared to a majority of the other rotary compression elements. The low traction rotary compression element may have (i) detachable drive elements and/or (ii) drive elements that are adjustable between an active configuration and an inactive configuration and/or (iii) removable cover elements that may be attached to the roller to cover the drive elements, at least partially.

In an embodiment, said low traction rotary compression element comprises a roller that is configured to rotate freely during opening of the rear part. The at least one low traction rotary compression element may be configured to disengage the drive means during opening of the rear part, whilst a majority of the other compression elements keep turning.

In an embodiment, the at least one low traction rotary compression element includes a clutch mechanism for disengaging the drive means. The clutch mechanism may be hydraulically actuated. Optionally, the bale chamber includes a hydraulic actuator for opening the rear part, and the hydraulic actuator and the clutch mechanism are hydraulically connected to operate in parallel so that the drive means disengages as the rear part opens.

In an embodiment, the at least one low traction rotary compression element comprises a roller that is configured to be displaceable away from a circumferential surface of the bale during opening of the rear part.

In an embodiment, the rear part of the bale chamber includes an upper part and a lower part, wherein the lower part is pivotally attached to the upper part, and wherein the at least one low traction rotary compression element is mounted on the lower part and is displaceable away from a circumferential surface of the bale by pivoting movement of the lower part. The bale chamber may include a first hydraulic actuator for opening the rear part, and a second hydraulic actuator for adjusting the position of the lower part, and wherein the first and second hydraulic actuators are hydraulically connected to operate in parallel.

At least one low traction rotary compression element may be provided in the rear part of the bale chamber. Alternatively or in addition at least one low traction rotary compression element may be provided in the front part of the bale chamber.

According to one embodiment of the present invention there is provided a baler apparatus having a cylindrical bale-forming chamber defined by a set of compression elements positioned around the circumference of the bale-forming chamber, and drive means configured to drive rotary movement of the compression elements, wherein at least one of the rotary compression elements is configured to provide a reduced level of friction relative to a bale in the bale chamber, as compared to at least one other rotary compression element.

For example, in one embodiment the at least one rotary compression element may have a relatively smooth drive surface.

In another embodiment, the at least one rotary compression element may be configured to rotate freely.

In another embodiment, the at least one rotary compression element may be configured to be displaceable away from a circumferential surface of the bale.

BRIEF DESCRIPTION OF THE DRAWINGS

Certain embodiments of the invention will now be described by way of example with reference to the accompanying drawings, wherein:

FIGS. 7a, 7b and 7c are end views of alternative compression rollers, comprising modified versions of the agricultural baler according to the first embodiment of the invention.

DETAILED DESCRIPTION OF THE PREFERRED EMBODIMENTS

Figure 1:
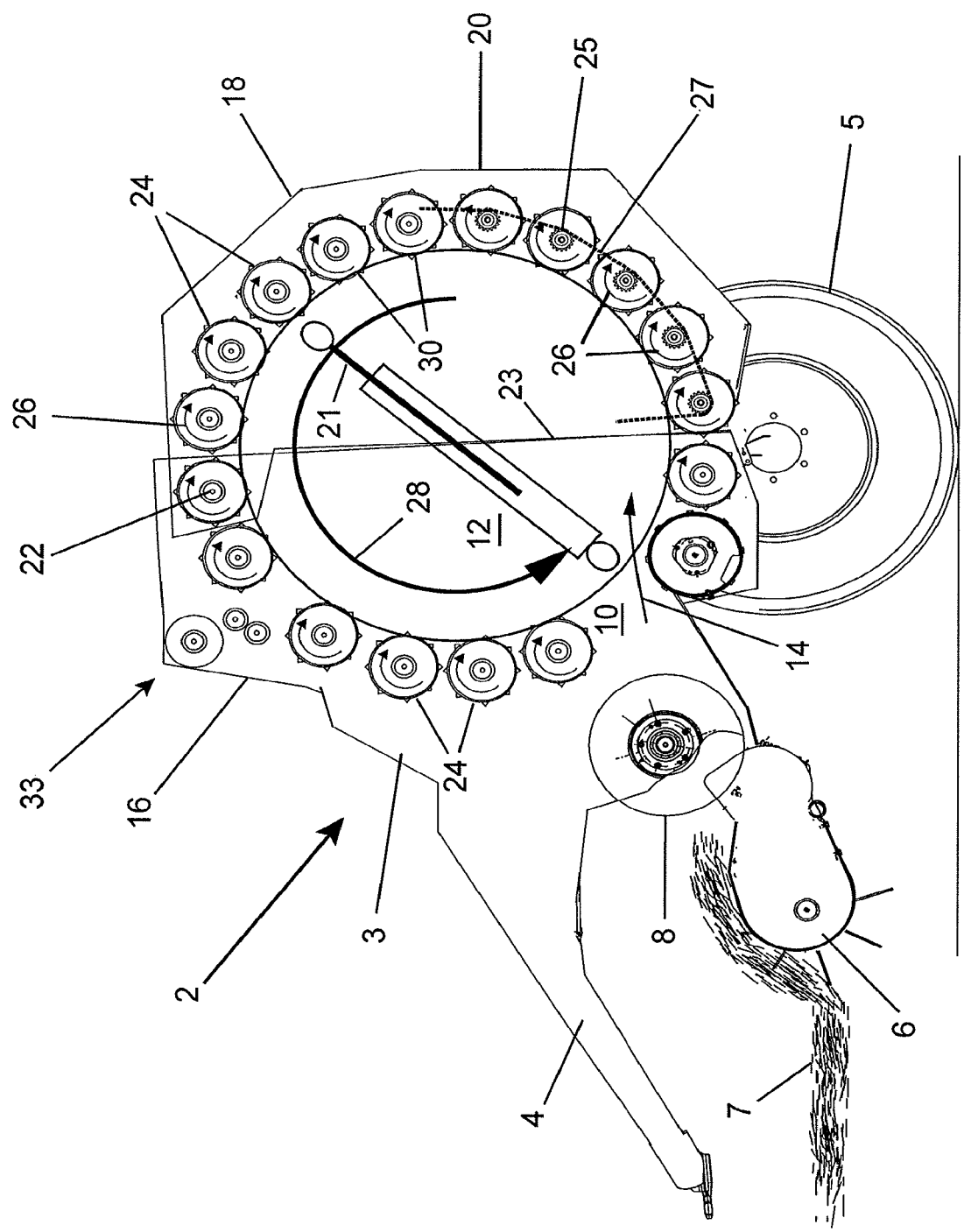
FIG. 1 is a side sectional view of a prior art agricultural baler in a closed configuration.
Figure 2:
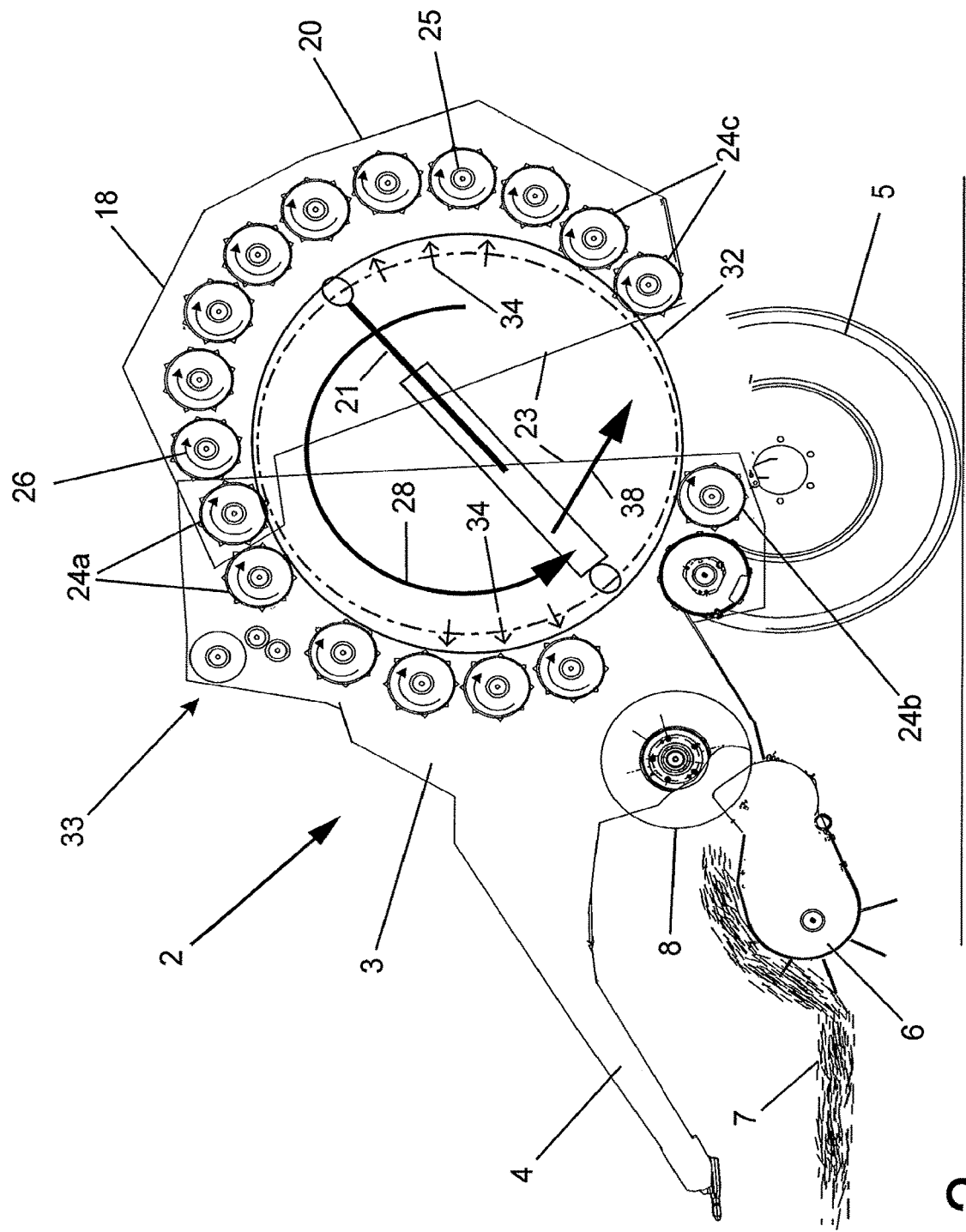
FIG. 2 is a side sectional view of the prior art baler in a first partially open configuration.
Figure 3:
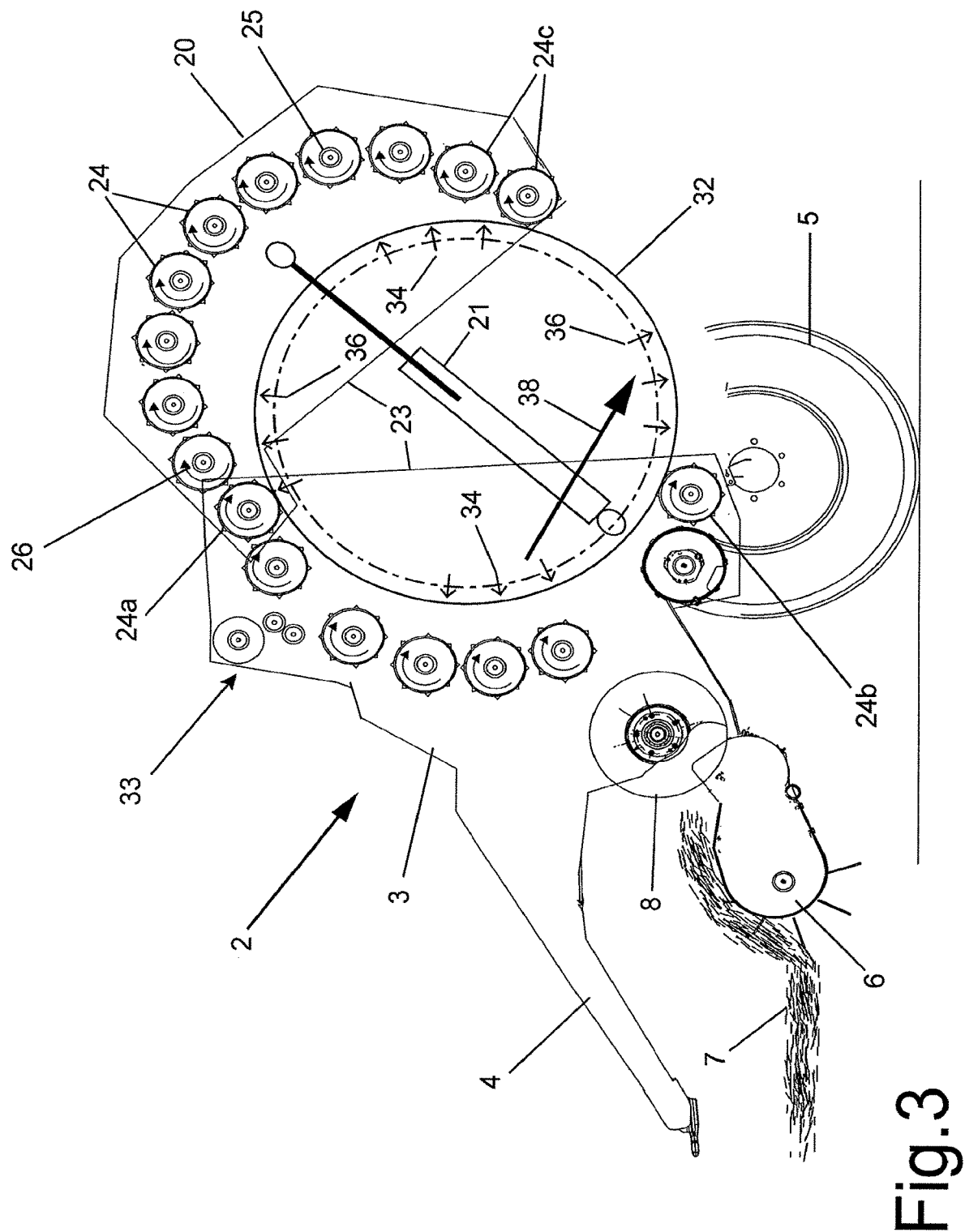
FIG. 3 is a side sectional view of the prior art baler in a second partially open configuration.

Referring now to FIGS. 1-3 of the drawings, a prior art agricultural baler designated generally by reference 2 comprises a wheeled machine that is intended to be towed behind a tractor or other propelling vehicle. The baler 2 includes a frame 3, a towbar 4 and a pair of wheels 5. The baler 2 will normally pick-up crop material that has already been cut or mown, and which is lying on the ground. A pick-up device 6 picks up the crop material 7, and feeds it to a rotary feeding device 8, which is optionally also a chopping device, and the chopped material is then fed through an inlet 10 into a cylindrical bale chamber 12, as shown by arrow 14.

The bale chamber 12 comprises a housing 13 consisting of a fixed part that is attached to the frame 3 and forms the front part 16 of the bale chamber, and a pivoting part that forms the rear part 18 of the bale chamber. The front and rear parts 16, 18 of the bale chamber are substantially symmetrical, each part forming approximately half of the bale chamber 12. The pivoting part 18 of the housing serves as a tailgate 20, which can be opened by pivoting the tailgate 20 about a pivot point 22 located towards the upper part of the bale chamber 12. An actuator 21, for example a hydraulic actuator, may be provided for adjusting the position of the tailgate 20. The tailgate 20 is shown in a closed condition in FIG. 1 and in first and second partially open conditions in FIGS. 2 and 3.

The cylindrical bale chamber 12 includes a pair of opposed side walls 23 and a set of compression rollers 24, which are spaced around the circumference of the bale chamber 12. Some of these compression rollers 24 are mounted within the fixed front part 16 of the bale chamber 12, and some are provided within the pivoting rear part 18 of the bale chamber 12. The compression rollers 24 are provided with drive means 25, for example drive sprockets, which are driven by a drive chain 27 and are configured to be rotated in the same direction, as indicated by the arrows 26 in FIGS. 1-3. This causes any bale material in the bale chamber 12 to rotate in the contrary direction, as indicated by arrow 28. The compression rollers 24 are provided with drive or traction elements 30, for example ribs or studs, which project from the cylindrical surfaces of the compression rollers 24 in order to transfer drive effectively to the bale material in the bale chamber 12.

During operation of the baler apparatus 2, crop material 7 is picked up from the ground by the pick-up device 6 and fed by the feeding device 8 into the bale chamber 12. The crop material is rotated by the rotating compression rollers 24 and starts to tumble, forming a cylindrical bale 32. As more material is fed into the bale chamber 12 the material is pressed towards the center of the bale chamber 12 by the rotating compression rollers 24, thereby compressing the bale 32.

When the bale material is sufficiently compressed the feeding of the material into the bale chamber 12 is stopped and a binding material, for example a net material (not shown), is fed from a binding device 33 and into the gap between the compression rollers 24 and the surface of the bale 32, and is wrapped around the compressed bale material as the bale continues to rotate. The binding serves to keep the bale material under compression and in shape after the bale 32 is ejected from the bale chamber 12. The binding material may alternatively consist of twine or plastic film material similar to that used for wrapping bales.

Once the bale has been bound the tailgate 20 is opened by pivoting about the pivot axis 22 under control of the actuator 21, to let the bale 32 roll out of the bale chamber 12. The compression rollers 24 continue to rotate to help eject the bale 32 from the bale chamber 12. After ejecting the bale 32, the tailgate 20 is closed and the baling process is repeated.

Due to the high compression of the bale material, when opening the tailgate 20 the compressed material tends to expand due to the elasticity of the binding material as shown in FIGS. 2 & 3, wherein the original circumference of the compressed bale is shown in chain line and the expanded circumference is shown in solid line. Typically the bale 32 expands from a diameter of 1.2 metres to an expanded diameter of 1.3 metres or more. As shown in FIG. 2, when the tailgate 20 starts to open the bale 32 expands to the front and the rear as indicated by arrows 34, but it cannot expand to the top or the bottom as it is still held between the top rollers 24a in the upper regions of the front and rear parts 16, 18 of the housing, and the bottom rollers 24b, 24c in the lower regions of the front and rear parts of the housing. As the tailgate 20 opens further as shown in FIG. 3, the bale 32 will also expand in the vertical direction as indicated by arrows 36, as it is ejected from the bale chamber in the direction of arrow 38.

Typically, the compression rollers 24 will be turning when the bale 32 is ejected, to help eject the bale from the bale chamber 12. When the bale is in the bale chamber 12 the bale will turn with a circumferential speed equal to that of the compression rollers 24. During the ejection process the bale 32 will stop turning and the (continually) turning compression rollers 24 will rub over the binding material on the outer circumference of the bale. This rubbing will occur especially with the top and bottom rollers 24a, 24b, 24c in the bale chamber, against which the bale 32 cannot initially expand.

This phenomenon occurs particularly with the lowest one or two rollers 24c in the tailgate 20, which tend to rub on one spot against the bale 32. The lowest roller 24b in the body 16 of the baler may also rub against the bale, but in some cases causes less of a problem because the ejection direction of the bale 32 is in the direction of rotation of the roller 24b. Therefore the roller 24b does not rub on one spot on the bale 32. The upper rollers 24a do not usually cause a significant problem since the weight of the bale 32 is not carried by the upper rollers 24a. The rubbing of the rotating lower rollers 24b, 24c in the pivoting rear part 18 of the bale chamber 12 or in the fixed front part 16 can damage the binding material with the risk that the binding material will break and the bale will burst open.

Figure 4A:
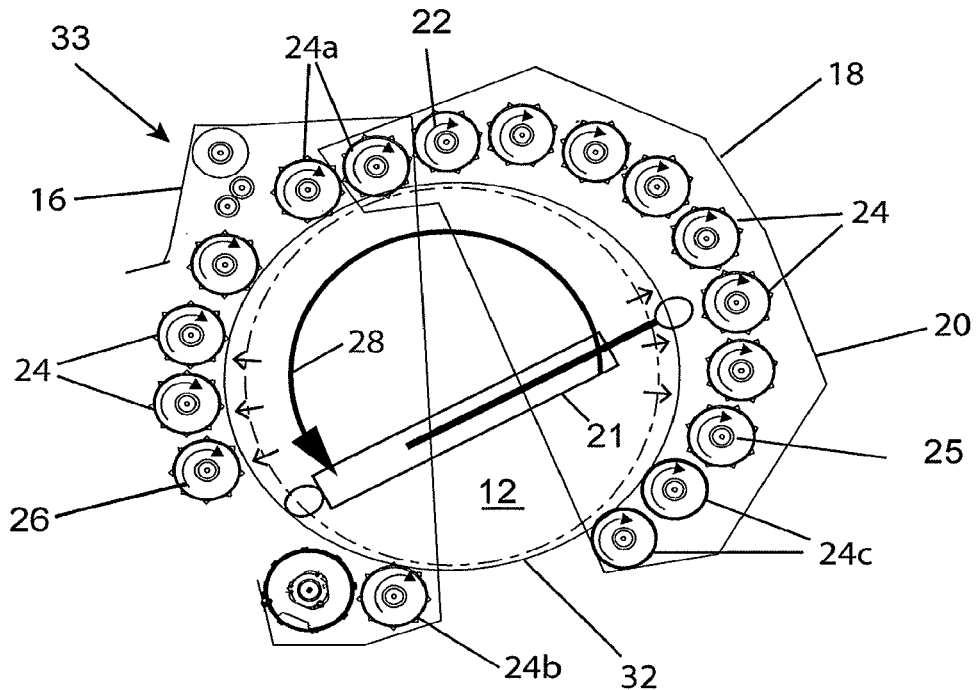
FIGS. 4a and 4b are side sectional views of an agricultural baler according to a first embodiment of the invention, in first and second partially open configurations.
Figure 4B:
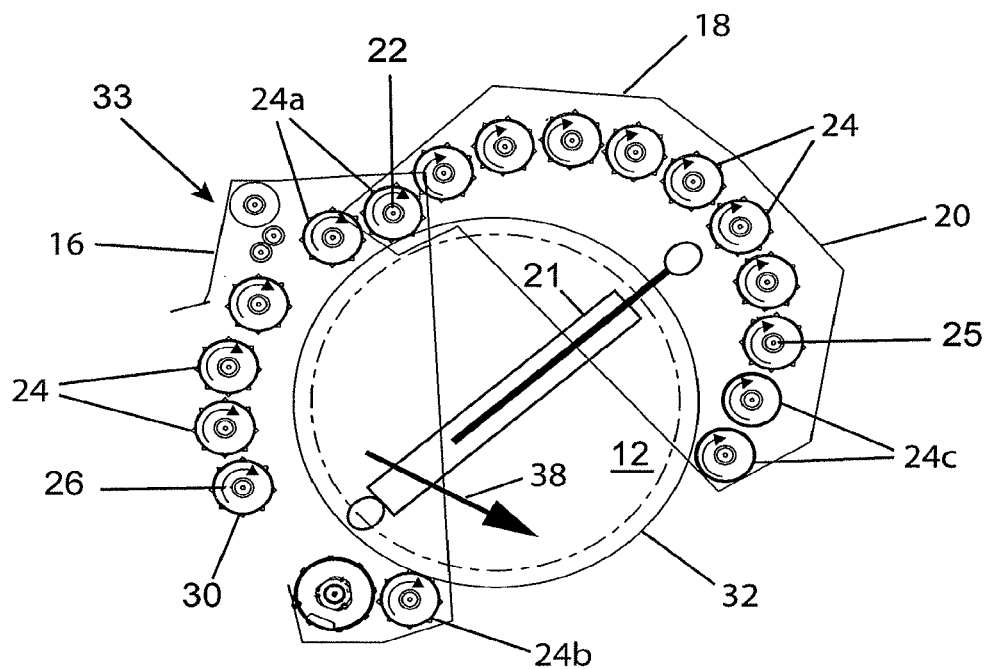

FIGS. 4a and 4b are side sectional views of a baler apparatus according to a first embodiment of the invention. Only the bale chamber 12 is shown, the other parts of the bale apparatus being conventional, for example as shown in FIGS. 1-3. The foregoing description therefore applies also to the first embodiment of the invention, except where indicated otherwise.

The bale chamber 12 is similar in most respects to that of the prior art bale apparatus shown in FIGS. 1-3 and comprises a fixed part that forms the front part 16 of the chamber, and a pivoting part that forms the rear part 18 of the chamber. The rear part 18 of the housing serves as a tailgate 20, which can be opened by pivoting the tailgate 20 about a pivot point 22 located towards the upper part of the bale chamber 12, through operation of an actuator. The tailgate 20 is shown in first and second partially open conditions in FIGS. 4a and 4b (the closed configuration is not shown).

As with the prior art bale apparatus shown in FIGS. 1-3 the cylindrical bale-forming chamber 12 includes a set of compression rollers 24, which are spaced around the circumference of the bale-forming chamber 12. Some of these compression rollers 24 are mounted within the fixed front part 16 of the bale chamber 12, and some are provided within the pivoting rear part 18 of the bale chamber 12, which serves as the tailgate 20. The compression rollers 24 are provided with drive means 25 (for example drive sprockets) and are configured to be rotated in the same direction, as indicated by the arrows 26. This causes any bale material in the bale chamber 12 to rotate in the contrary direction, as indicated by arrow 28. A binding device 33 is configured to supply a binding material, for example a net material, which is wrapped around the compressed bale material as the bale rotates.

Most of the compression rollers 24 are provided with drive elements 30, for example ribs or studs, which project from the cylindrical surface of the compression roller 24 in order to transfer drive effectively to the bale material in the bale chamber 12. However, one or more of the lowest rollers 24b, 24c either do not have drive elements, or have significantly reduced drive elements: that is, they have drive elements that are reduced in number and/or size as compared to the majority of the other compression rollers 24. The rollers that either do not have drive elements, or that have significantly reduced drive elements, comprise low traction rotary compression elements, which are able to rotate against the surface of the bound bale without causing significant damage to the binding material. The low traction rotary compression elements may for example consist of smooth or polished rollers, and they may optionally be provided with a non-stick coating, for example of PTFE.

In the embodiment shown in FIGS. 4a and 4b only the two lowest rollers 24c in the rear part 18 of the bale chamber 12 comprise low traction rotary compression elements. Alternatively, one or more of the lowest rollers 24b in the front part 18 of the bale chamber may comprise low traction rotary compression elements, or one or more of the lowest rollers 24b, 24c in the front and rear parts 18, 20 of the bale chamber may comprise low traction rotary compression elements.

Optionally, as illustrated in FIGS. 7a-7c, each roller 24 comprising a low traction rotary compression element may be provided with detachable or reconfigurable drive elements, which can be reconfigured to provide drive when the crop material is slippery (for example, when it is extremely dry) so as to increase the traction between the roller 24 and the bale 32.

In the example shown in FIG. 7a removable cover plates 50 are provided, which can be attached to the roller 24 between the drive elements 30, for example with bolts 52. When the cover plates 50 are fitted they cover the drive elements 30, thereby converting the roller 24 into a low traction rotary compression element. The cover plates 50 may be removed when extra traction is required.

In the example shown in FIG. 7b, adjustable drive elements 30' are provided, each of which can be adjusted between a low traction retracted position (shown in solid lines) and a high traction protruding position (shown in broken lines). The adjustable drive elements 30' may be adjusted either manually (for example through use of a lever), or automatically by means of an actuator.

In the example shown in FIG. 7c removable drive elements 30" are provided, which can be attached to the roller 24, for example with bolts 52. When the removable drive elements 30" are fitted they protrude from the surface of the roller 24 to provide addition traction. The removable drive elements 30" may be removed when extra traction is not required, so converting the roller 24 into a low traction rotary compression element.

In the embodiment shown in FIGS. 4a and 4b the two lowest rollers 24c in the rear part 18 of the bale chamber comprise low traction rotary compression elements. Typically, one or two of the lowest rollers 24c will comprise low traction rotary compression elements, although in certain cases more than two of the lowest rollers 24c may comprise low traction rotary compression elements.

Figure 5A:
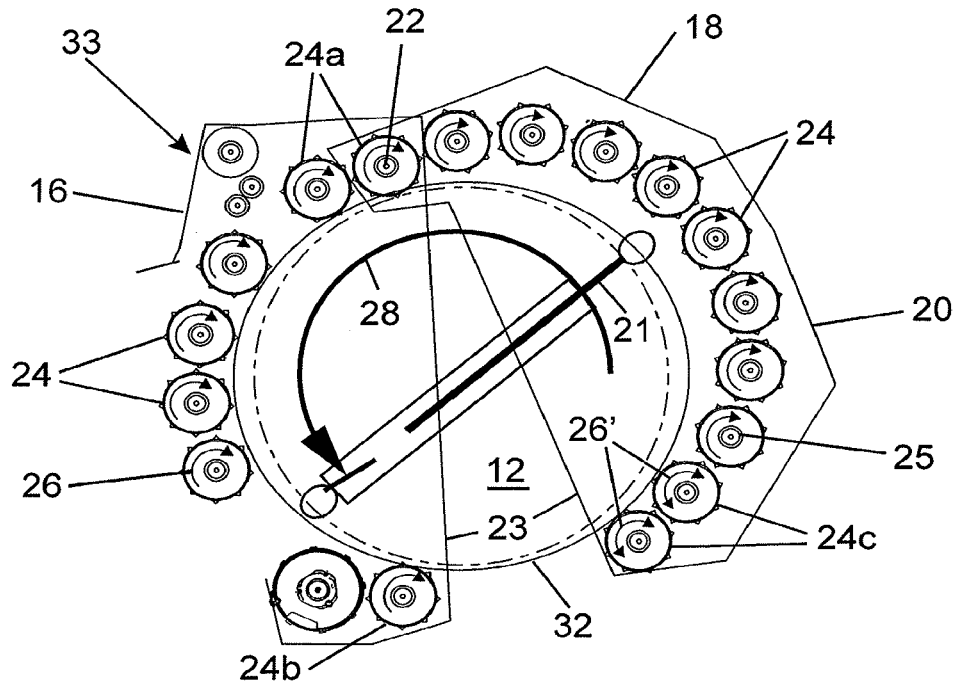
FIGS. 5a and 5b are side sectional views of an agricultural baler according to a second embodiment of the invention, in first and second partially open configurations.
Figure 5B:
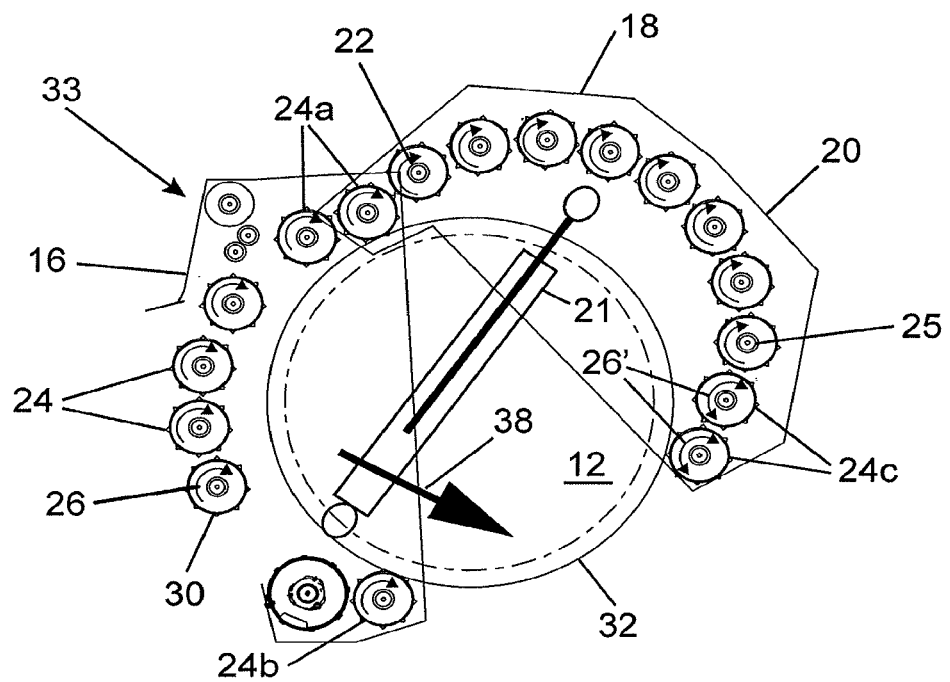

FIGS. 5a and 5b are side sectional views of a baler apparatus according to a second embodiment of the invention. Only the bale chamber 12 is shown, the other parts of the baler being conventional, for example as shown in FIGS. 1-3. The foregoing description of the prior art baler therefore applies also to the second embodiment of the invention, except where indicated otherwise.

The bale chamber 12 is similar in most respects to that of the prior art baler shown in FIGS. 1-3 and comprises a fixed part that forms the front part 16 of the bale chamber, and a pivoting part that forms the rear part 18 of the bale chamber. The pivoting rear part 18 of the bale chamber serves as a tailgate 20, which can be opened by pivoting the tailgate 20 about a pivot point 22 located towards the upper part of the bale chamber 12, through operation of an actuator 21. The tailgate 20 is shown in first and second partially open conditions in FIGS. 5a and 5b (the closed configuration is not shown).

As with the prior art bale apparatus shown in FIGS. 1-3 the cylindrical bale chamber 12 includes a set of compression rollers 24, which are spaced around the circumference of the bale chamber 12. Some of these compression rollers 24 are mounted within the fixed front part 16 of the bale chamber 12, and some are provided within the pivoting rear part 18 of the bale chamber 12. The compression rollers 24 are provided with drive means 25 (for example sprockets or pulleys) and are configured to be rotated in the same direction, as indicated by the arrows 26. This causes any bale material in the bale chamber 12 to rotate in the contrary direction, as indicated by arrow 28. A binding device 33 is configured to supply a binding material, for example a net material, which is wrapped around the compressed bale material as the bale rotates.

In this embodiment of the invention one or more of the lowest rollers 24c in the rear part 18 of the bale chamber 12 can optionally be disconnected from the drive means, allowing them to rotate freely in either direction as indicated by double-headed arrows 26', while the other rollers 24 remain connected to the drive means and continue to rotate. These rollers 24c thus become low traction rotary compression elements 24c when disconnected from the drive means 25. In operation, the low traction rotary compression elements 24c are disconnected from the drive means 25 as the tailgate 20 opens, to avoid relative motion between the low traction rotary compression elements 24c and the surface of the bale 32, thus preventing possible damage to the binding material. The low traction rotary compression elements 24c may be disconnected from the drive means either automatically as the tailgate 20 opens, or upon receiving a command from the operator of the baler apparatus.

In the embodiment shown in FIGS. 5a and 5b only the two lowest rollers 24c in the rear part 18 of the bale chamber comprise low traction rotary compression elements. Alternatively, the one or two lowest rollers 24b in the front part 16 of the bale chamber may comprise low traction rotary compression elements, or low traction rotary compression elements may be provided in the front and rear parts 16, 18 of the bale chamber 12.

Figure 8B:
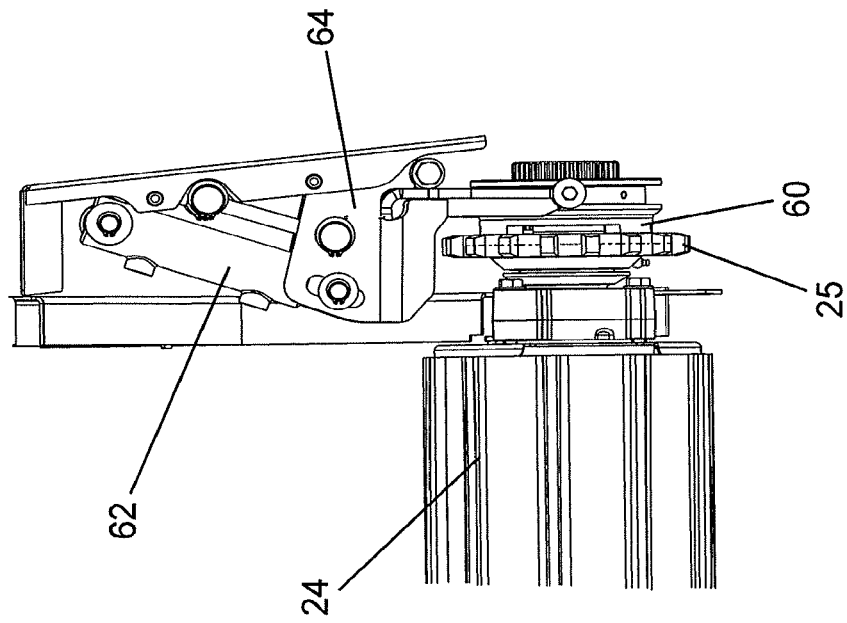
FIGS. 8a and 8b are detailed views of a clutch mechanism that forms part of an agricultural baler according to the second embodiment of the invention, in disengaged and engaged configurations.
Figure 8A:
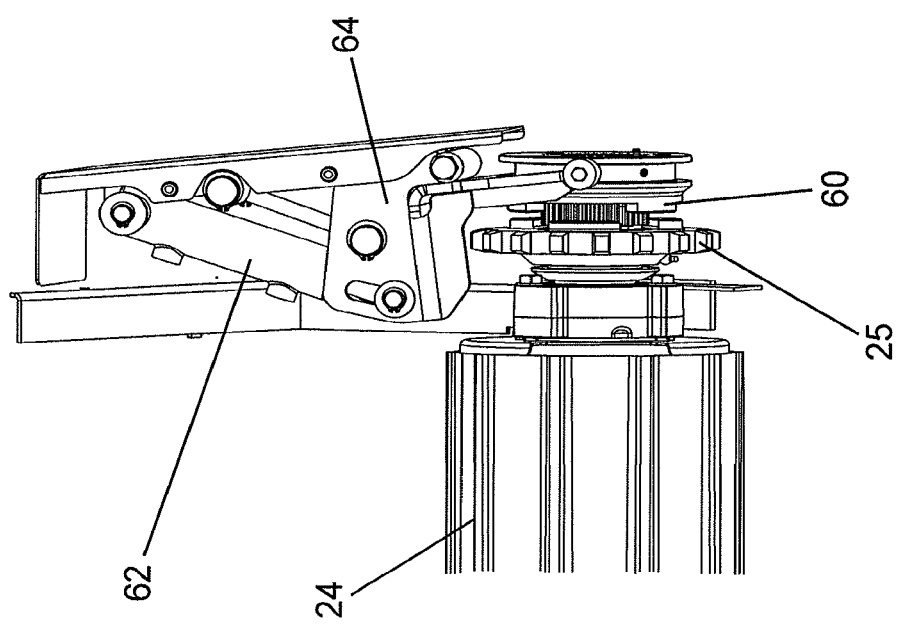

Optionally, the low traction rotary compression elements 24c may be configured to disengage the drive means automatically during opening of the pivoting part 18. For example, as illustrated in FIGS. 8a and 8b, each low traction rotary compression element may include a clutch mechanism 60 for disengaging the drive means, which may be operated by a hydraulic actuator 62. In this embodiment, the clutch mechanism 60 comprises a dog clutch that transmits drive from the drive sprocket 25 to the roller 24 when the clutch is engaged, as shown in FIG. 8b. When the clutch 60 is disengaged as shown in FIG. 8a, no drive is transmitted and the roller is able to rotate freely. The hydraulic actuator 62 operates the clutch 60 via a claw coupling 64. If the bale chamber 12 includes a hydraulic actuator for opening the pivoting part 18, it may be connected to operate in parallel with the clutch actuator 62 so that the low traction rotary compression elements are disconnected from the drive means automatically as the tailgate 20 opens.

Figure 6A:
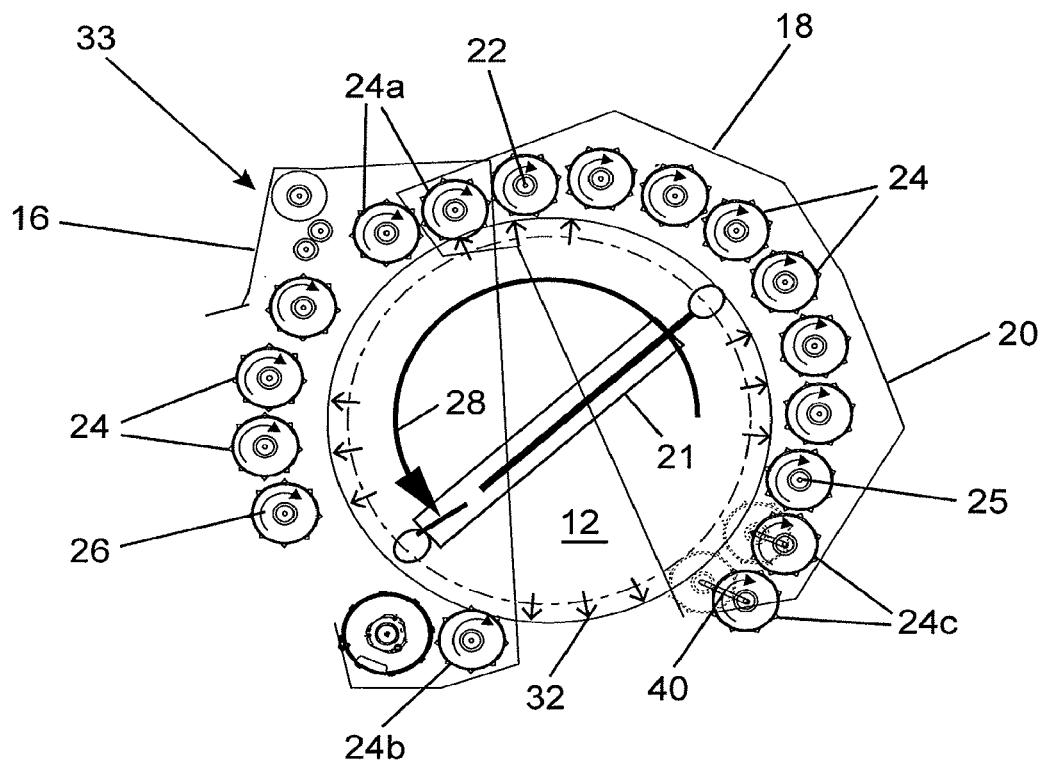
FIGS. 6a and 6b are side sectional views of an agricultural baler according to a third embodiment of the invention, in first and second partially open configurations.
Figure 6B:
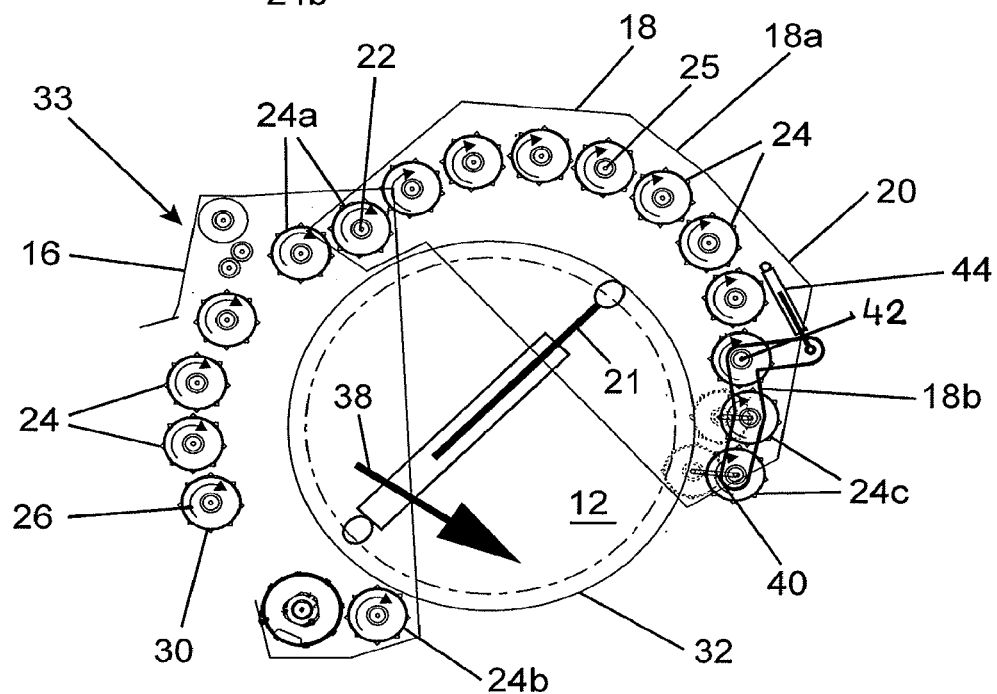

FIGS. 6a and 6b are side sectional views of a baler apparatus according to a third embodiment of the invention. Only the bale chamber is shown, the other parts of the bale apparatus being conventional, for example as shown in FIGS. 1-3. The foregoing description of the prior art baler therefore applies also to the third embodiment of the invention, except where indicated otherwise.

The bale chamber 12 is similar in most respects to that of the prior art bale apparatus shown in FIGS. 1-3 and is located within a housing comprising a fixed part that forms the front part 16 of the bale chamber, and a pivoting part that forms the rear part 18 of the bale chamber. The pivoting rear part 18 of the housing serves as a tailgate 20, which can be opened by pivoting the tailgate 20 about a pivot point 22 located towards the upper part of the bale chamber 12, through operation of an actuator. The tailgate 20 is shown in first and second partially open conditions in FIGS. 4a and 4b (the closed configuration is not shown).

As with the prior art bale apparatus shown in FIGS. 1-3 the cylindrical bale chamber 12 includes a set of compression rollers 24, which are spaced around the circumference of the bale-forming chamber 12. Some of these compression rollers 24 are mounted within the fixed front part 16 of the bale chamber 12, and some are provided within the pivoting rear part 18 of the bale chamber 12. The compression rollers 24 are provided with drive means 25 and are configured to be rotated in the same direction, as indicated by the arrows 26. This causes any bale material in the bale chamber 12 to rotate in the contrary direction, as indicated by arrow 28. A binding device 33 is configured to supply a binding material, for example a net material, which is wrapped around the compressed bale material as the bale rotates.

In this embodiment of the invention one or more of the lowest rollers 24c in the rear part 18 of the bale chamber 12 are mounted so as to allow them to be displaced away from the circumferential surface of the bale 32 when the tailgate 20 opens. The lowest rollers 24c may for example be mounted in bearings that can slide along slide tracks 40. These rollers thus become low traction rotary compression elements when displaced away from the bale 32.

In the embodiment shown in FIGS. 6a and 6b only the two lowest rollers 24c in the rear part 18 of the bale chamber can be displaced away from the bale 32 and therefore comprise low traction rotary compression elements. Alternatively, one or more lowest rollers 24b in the front part 16 of the bale chamber may be designed so that they can be displaced away from the bale 32. Alternatively, low traction rotary compression elements comprising displaceable rollers may be provided in the lower section of the front and rear parts 16, 18 of the bale chamber 12.

In the embodiment shown in FIGS. 6a and 6b, the rear part 18 of the bale chamber includes an upper part 18a and a lower part 18b that is pivotally attached to the upper part 18a at pivot point 42. Pivoting movement of the lower part 18b about the pivot point 42 is controlled by an actuator 44. The lowest rollers 24c that serve as low traction rotary compression elements are connected to the lower part 18b, so that movement of the rollers 24c along the slide tracks 40 is controlled by pivoting movement of the lower part 18b. The lowest rollers 24c are thus configured to be displaceable away from the circumferential surface of the bale by pivoting movement of the lower part 18b. The bale chamber 12 may include a first hydraulic actuator 21 for opening the pivoting part 18 and a second hydraulic actuator 44 for adjusting the position of the lower part 18b, and the first and second hydraulic actuators 21, 44 may optionally be hydraulically connected to operate in parallel, so that the low traction rotary compression elements are automatically displaced away from the surface of the bale as the tailgate 20 opens.

Various modifications of the baler apparatus described herein are possible. For example, the invention may be applied to a combined/integrated baler and wrapper apparatus. Instead of using rollers as the compression elements, some of the rollers may be replaced by compression elements consisting of rotating chains or belts, as commonly used on certain known types of baler apparatus. The bale can be bound with netting or alternatively with twine or plastic film material, for example similar to that commonly used for wrapping bales.

The invention claimed is:

1. An agricultural baler comprising:
a frame;
a pick-up device;
a cylindrical bale chamber; and
a binding device that supplies a binding material for binding a bale formed in the bale chamber;
wherein the bale chamber comprises:
an inlet,
two opposed side walls forming ends of the bale chamber,
a set of rotary compression elements positioned within the bale chamber,
drive means configured to drive rotary movement of the rotary compression elements,
a front part and a rear part, each of the front and rear parts comprising approximately one half of the bale chamber, wherein the rear part is attached to the front part through a pivot joint so that the rear part can pivot between a closed condition for forming a bale in the bale chamber and an open condition for releasing a bale from the bale chamber, and
wherein the set of rotary compression elements includes at least one low traction rotary compression element, which is located within a lower part of the bale chamber and is configured to provide a reduced level of traction to a bale in the bale chamber, as compared to a majority of the other rotary compression elements, at least when the rear part is in an open condition,
wherein the at least one low traction rotary compression element includes a roller that is configured to rotate freely during opening of the rear part, and
wherein drive means to the at least one low traction rotary compression element is configured to disengage during opening of the rear part, while a majority of the other compression elements keep turning.

2. An agricultural baler according to claim 1, wherein a clutch mechanism disengages the drive means to the at least one low traction rotary compression element.

3. An agricultural baler according to claim 2, wherein the clutch mechanism is hydraulically actuated.

4. An agricultural baler according to claim 3, wherein the bale chamber includes a hydraulic actuator for opening the rear part, and wherein the hydraulic actuator and the clutch mechanism are hydraulically connected to operate in parallel.

5. An agricultural baler according to claim 1, wherein at least one low traction rotary compression element is provided in the rear part of the bale chamber.

6. An agricultural baler according to claim 1, wherein at least one low traction rotary compression element is provided in the front part of the bale chamber.

7. An agricultural baler according to claim 1, wherein the pivot joint is located towards an upper part of the bale chamber.

* * * * *